United States Patent [19]
David

[11] Patent Number: 6,018,311
[45] Date of Patent: Jan. 25, 2000

[54] NONCOHERENT GAIN ENHANCEMENT TECHNIQUE FOR IMPROVED DETECTION-ESTIMATION PERFORMANCE

[75] Inventor: George T. David, Oro Valley, Ariz.

[73] Assignee: Raytheon Company, Lexington, Mass.

[21] Appl. No.: 09/115,010

[22] Filed: Jul. 14, 1998

[51] Int. Cl.[7] .................................................. G01S 7/285
[52] U.S. Cl. ........................... 342/196; 342/95; 342/101; 342/162
[58] Field of Search .............................. 342/196, 67, 90, 342/93, 95, 96, 97, 101, 107, 113, 115, 194, 195, 159, 162

[56] References Cited

U.S. PATENT DOCUMENTS

| | | | |
|---|---|---|---|
| 3,610,901 | 10/1971 | Lynch | 708/300 |
| 4,104,631 | 8/1978 | Weigle et al. | 342/194 |
| 5,014,064 | 5/1991 | Spencer et al. | 342/427 |
| 5,457,462 | 10/1995 | Mitsumoto et al. | 342/99 |
| 5,594,451 | 1/1997 | Krikorian et al. | 342/203 |

FOREIGN PATENT DOCUMENTS

| | | | |
|---|---|---|---|
| 2634901 | 2/1990 | France | G01S 13/50 |
| 2736161 | 1/1997 | France | G01S 13/52 |
| 04198790 | 7/1992 | Japan | G01S 7/02 |
| 06242233 | 9/1994 | Japan | G01S 13/53 |
| 06308230 | 11/1994 | Japan | G01S 13/72 |

OTHER PUBLICATIONS

"On the Use of windows for Harmonic Analysis with the Discrete Fourier Transform," by Fredric J. Harris, Proceedings of the IEEE, vol. 66, No.1, Jan. 1978, pp. 51–83.

*Primary Examiner*—John B. Sotomayor
*Attorney, Agent, or Firm*—David W. Collins; Andrew J. Rudd; Glenn H. Lenzen, Jr.

[57] ABSTRACT

A system and method of processing data in a sensor system which receives signal returns from pulsed coherent transmitted signals which are transmitted at a pulse repetition rate and with a pulse repetition interval (PRI). The method includes providing range-filtered data in response to the received signal returns; formatting successive sets of data received during a post detection integration (PDI) interval into a plurality of overlapping coherent processing interval (CPI) data sequences; performing FFT processing on the overlapping CPI data sequences to provide transformed data sequences; performing range-sample CPI processing on the transformed data sequences; and performing noncoherent integration (NCI) processing on output data from the range-sample CPI processed data sequences over a range trajectory in accordance with hypothesized radar-target range rate to provide noncoherent gain-enhanced output data. A range trajectory derived from a hypothesized radar-target range rate is updated at a compensation rate no more often than once per PDI interval.

14 Claims, 3 Drawing Sheets

6,018,311

NONCOHERENT GAIN ENHANCEMENT TECHNIQUE FOR IMPROVED DETECTION-ESTIMATION PERFORMANCE

TECHNICAL FIELD OF THE INVENTION

This invention relates to active and semiactive radars, and more particularly to radar-receiver signal processors matched to coherently pulsed radar signals in a moving-target environment, and more particularly to techniques for providing enhanced signal-processing gains in such signal processors.

BACKGROUND OF THE INVENTION

Active and/or semiactive radar-receiver signal processors can be "matched" to coherently pulsed radar signals in a moving-target engagement. This type of processor typically updates hypothesized own-ship/target differential-Doppler compensation (range-rate aiding) at a coherent processing interval (CPI) rate to develop a detection statistic via simple zero-order noncoherent post detection integration (PDI). This CPI-rate compensation of hypothesized differential own-ship/target Doppler prohibits the application of overlapped-CPI noncoherent PDI processing, since desired-signal coherence within the overlapped observation intervals will be destroyed.

Overlapped-CPI processing has been used in a radar system to effectively increase the observation rate. This system did not provide, in this overlapped-CPI mode, any post detection integration or noncoherent gain enhancement.

SUMMARY OF THE INVENTION

The Noncoherent Gain Enhancement (NGE) algorithm technique, in accordance with an aspect of the invention implements noncoherent integration, over one or more hypothesized range-rate trajectories, of an enlarged signal set obtained from overlapped coherent processing intervals (CPIs). This technique of noncoherent integration provides a significant improvement, over conventional radar processing, in target detection and target-parameter estimation. The majority of this gain enhancement is associated with the recovery of the signal-processing loss that results from the application of severe amplitude-weighting windows to signal-data time series prior to DFT/FFT processing. This signal-processing gain is achieved by inhibiting the compensation rate of hypothesized (cued) target Doppler to no more often than once per post detection-integration (PDI) interval to permit noncoherent integration of overlapped CPIs over this PDI interval.

The NGE algorithm provides, over the same observation (PDI) interval, noncoherent integration of a much larger number of coherently processed signals to effect greater signal processing gains. The signal processing gains achievable, in an active or semiactive radar system, are comparable to that associated with a doubling of transmitter power without the attendant doubling of monostatic or bistatic clutter.

BRIEF DESCRIPTION OF THE DRAWING

These and other features and advantages of the present invention will become more apparent from the following detailed description of an exemplary embodiment thereof, as illustrated in the accompanying drawings, in which:

FIG. 2A illustrates 50% overlapping of the CPI data frames, and FIG. 2B illustrates 75% overlapping of the CPI data frames.

DETAILED DESCRIPTION OF THE PREFERRED EMBODIMENT

In accordance with an aspect of this invention, a noncoherent gain enhancement (NGE) technique implements noncoherent integration of an enlarged signal set obtained from overlapped coherent processing intervals (CPIs) over one or more hypothesized range-rate trajectories. This method of noncoherent integration provides a significant improvement, over conventional radar processing, in target detection and target-parameter estimation. Signal-processing improvements that correspond to SNR gains of 2 dB –3.5 dB are conservatively predicted for target detection and parameter (e.g., target range, Doppler and angle) estimation, respectively. The majority of this gain enhancement is associated with the recovery of the signal-processing loss that results from the application of severe amplitude-weighting windows (e.g., –80 dB Dolph-Chebyshev weights) to signal-data time series prior to digital Fourier Transform/Fast Fourier Transform (DFT/FFT) processing. This signal-processing gain is achieved by inhibiting the compensation rate of hypothesized (cued) target Doppler to no more often than once per post detection-integration (PDI) interval to permit noncoherent integration of overlapped CPIs over this PDI interval. Conventional radar processors effect relative own-ship/target-Doppler compensation at a CPI rate to permit zero-order integration of a contiguous (nonoverlapping) sequence of coherently processed data.

Figure 1:
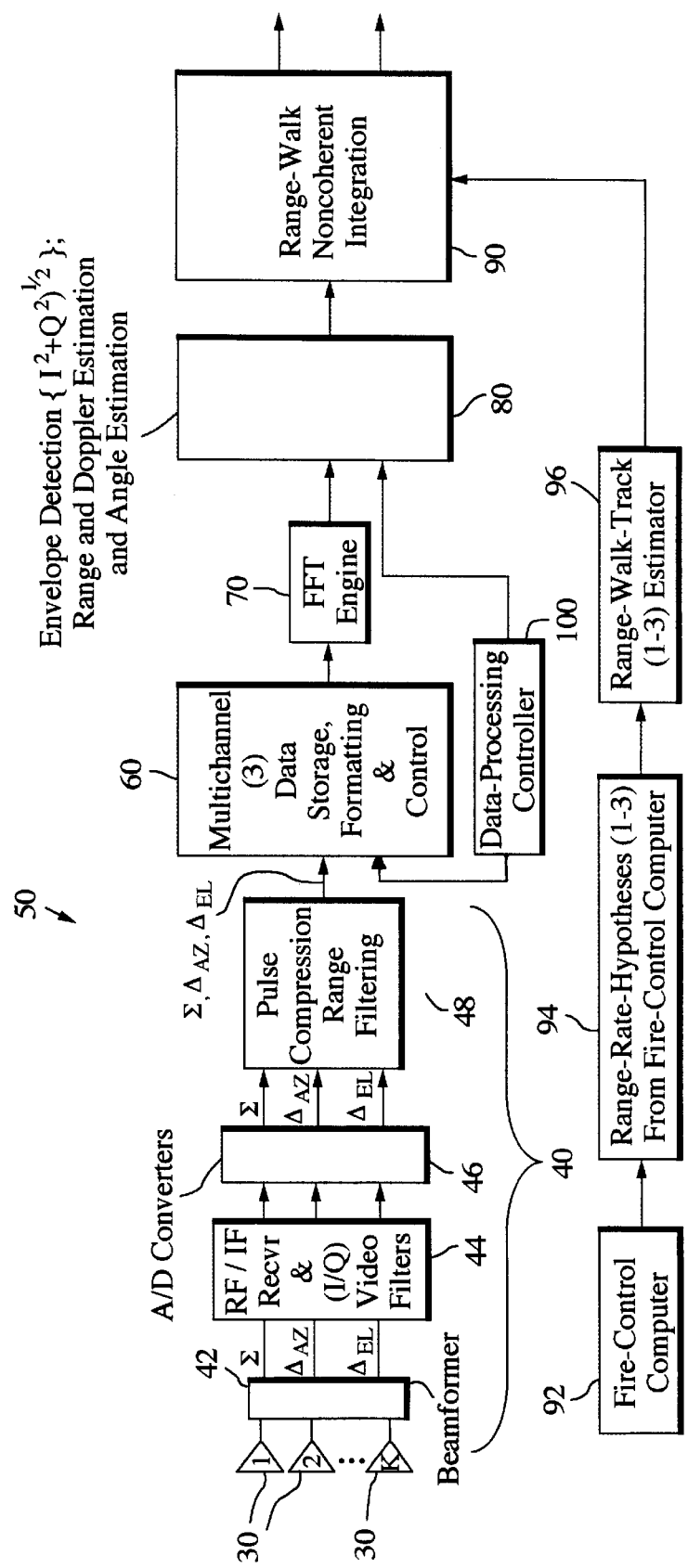
FIG. 1 is a schematic block diagram of an exemplary radar system employing the present invention.

FIG. 1 is a schematic block diagram of an exemplary radar system 50 employing the present invention. The system includes K antenna elements or subarrays 30, and a radar receiver/signal processor 40. The receiver/processor includes a beamformer 42 which forms a sum beam signal ($\Sigma$) and azimuth and elevation difference beam signals ($\Delta_{Az}$ and $\Delta_{El}$). These signals are input at RF frequencies to the RF/IF receiver 44 which downconverts these beam signals to video signal frequencies, and passes the downconverted signals through in-phase/quadrature (I/Q) video filters. The video signals from the receiver 44 are converted to digital form by the analog-to-digital (A/D) converters 46. The digitized signals are then processed by pulse compression range filtering 48, to provide, in digital form, the processed sum and difference channel radar signals ($\Sigma$, $\Delta_{Az}$ and $\Delta_{El}$).

It is assumed, for this exemplary embodiment, that the transmitted signal (and therefore, the received target signal) is a coded (e.g., binary phase-coded) signal of pulse length T and amplitude A (to provide illumination of a target with a high-energy waveform, $E=A^2T/2$). Upon reception, the binary phase-coded signal T seconds long is compressed via replica correlation to provide a compressed pulse of pulse width $T_c=\alpha T$, and amplitude $A_c=A/\alpha$; a representative binary phase code might correspond to a Barker sequence of length 13, so that $T_c=T/13$ and $A_c=13A$. This waveform permits "effective illumination" of a target with a waveform that, upon compression in the receiver, appears to have been obtained from a higher-amplitude pulse (13A) of compressed pulse length T/13, also providing enhanced range resolution.

The radar system 50 further includes a multichannel (three in this embodiment) data storage, formatting and control apparatus 60. The three channels of data provided by the apparatus 60 are provided to a Fast Fourier Transform (FFT) engine 70 for FFT processing. The FFT-processed data are then processed by envelope detection $((I^2+Q^2)^{1/2})$ and/or monopulse-ratio discriminant processor 80. Functions performed by the FFT engine 70 and processor 80 are conventional radar-processing functions.

The data provided by processor 80 are then processed by a Range-Walk Noncoherent integration (NCI) processor 90. A fire-control computer 92 in this exemplary embodiment provides several (three, in this example) range-rate hypotheses 94 to a Range-Walk-Track estimator 96. Based on a hypothesized (cued) range-rate estimate, the estimator 96 determines the number of range samples that the target will traverse over the PDI interval and the number of overlapped-CPI-processed parameters available for noncoherent integration within each range sample associated with the hypothesized target trajectory, e.g. it determines the overlapped-CPI (OL-CPI) sequence lengths of 10, 12, 12, 3 for a Mach-2 rancre-closure example. The estimator 96 instructs the processor 90 to integrate, noncoherently, 10 estimates corresponding to range sample $R_0$, 12 from $R_1$, 12 from $R_2$, and 3 from $R_3$; this integration result is associated with range walk commencing at $R_0$. Similarly, a range walk commencing at $R_1$ would accumulate 10 estimates from $R_1$, 12 from $R_2$, 12 from $R_3$, and 3 from $R_4$. A range walk is formed for each range sample in the target cue.

The NCI processor 90 provides as output data a Constant False-Alarm Rate (CFAR) detection statistic from the sum channel to provide initial range/Doppler estimates, and parameter estimates such as range/Doppler/angle estimates, from the sum and difference channels. The processor 90 provides functions unique to this invention. Conventional radar signal processors, that implement noncoherent integration of sequential CPI-rate data, apply range-rate updates, i.e., range delays or advances, to a sequence of nonoverlapping CPIs to "compensate" for opening or closing range rates, respectively. As an illustration of this process, consider a Mach-2 closing engagement and a PRF of 25 kHz. Over one CPI (e.g. 128 PRIs), the target-to-radar range will close by 3.4 meters. This range closure will require a range advance (increase) of 3.4 meters (about 5.12 milliseconds) applied, sequentially, to each of the following nonoverlapping CPIs within the PDI interval, so that target data will reside within the same range sample over the sequence of CPIs within the PDI interval. The appropriate processed parameters (e.g., detection statistic, range, Doppler and angle estimates) can be noncoherently integrated, via zero-order filters, to achieve further processing gains. These inter-CPI range advances destroy inter-CPI signal coherence, thereby precluding the application of "effective" overlapped-CPI processing. By disabling the range-rate-aiding function, overlapped CPIs will retain signal coherence and the noncoherent processing gains claimed for this invention can be realized.

Figure 2A:
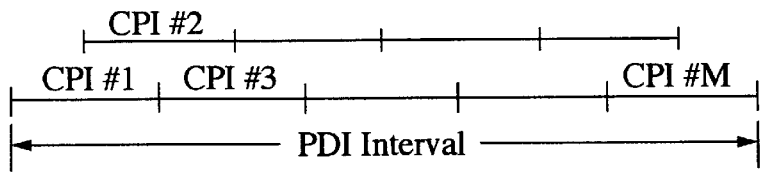
FIGS. 2A and 2B are time diagrams illustrating operation of the radar system in accordance with the invention.
Figure 2B:
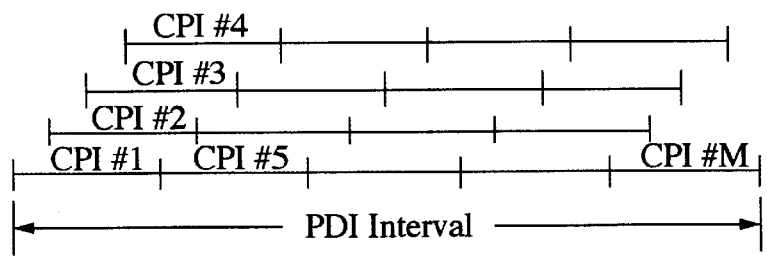
Figure 3:
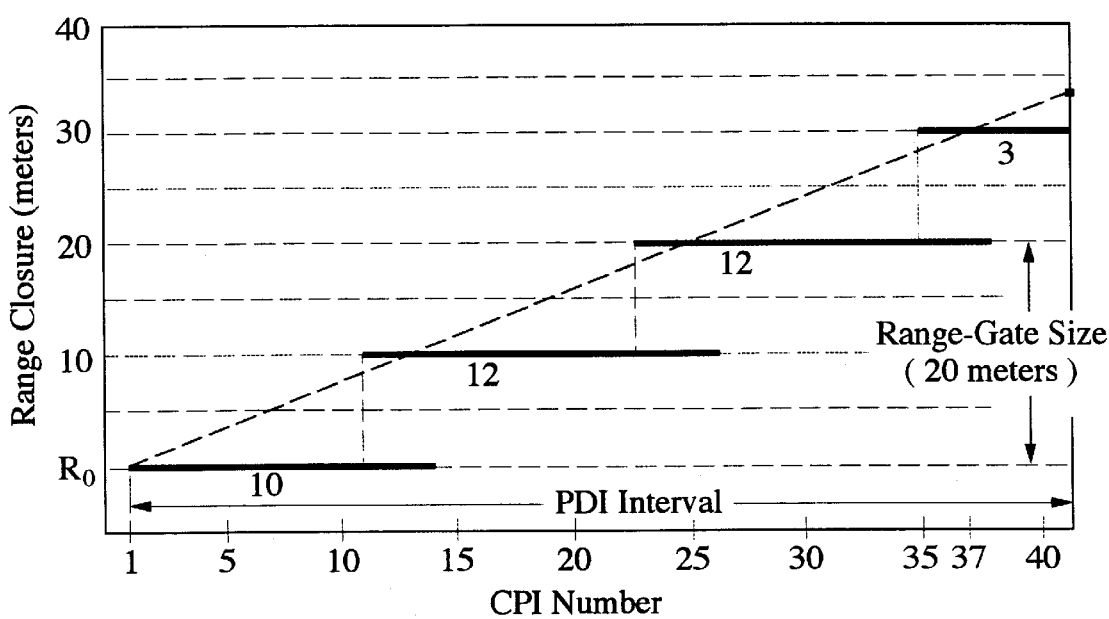
FIG. 3 is a plot of the range closure as a function of the CPI number over a PDI interval, for an exemplary case of 75% overlapping of the CPI data frames.

The operation of the radar system in accordance with the invention is illustrated in the time diagrams of FIGS. 2A–2B and 3. FIG. 2A illustrates 50% overlapping of the CPI data frames, and FIG. 2B illustrates 75% overlapping of the CPI data frames. With range-rate (differential-Doppler) compensation applied at a PDI-interval rate, overlapped CPI data frames within the PDI interval are successively subjected to DFT/FFT processing. This overlapping is possible, since desired-signal coherence is maintained within the overlapped intervals due to the range-rate compensation being applied no more frequently than at a PDI-interval rate. As illustrated in FIG. 2A, if N corresponds to the number of contiguous, i.e. non-overlapping, CPI data sequences or data frames available within the PDI interval, then, with 50% overlapping, the number of overlapped CPI sequences within the same PDI interval is given by M=2N−1. Similarly, the corresponding number for 75% overlapping is given by M=4N−3, and the 75% overlapping is shown in FIG. 2B. The practical number for M is limited by the temporal correlation exhibited by the interference signal (e.g., receiver noise) between adjacent CPI sequences.

Although reducing the update rate of hypothesized (cued) differential Doppler compensation (range-rate-aiding) to coincide with the PDI interval permits effective coherent processing within each overlapped-CPI interval, noncoherent integration would be suboptimum using traditional zero-order integration over the entire PDI interval if the range trajectory occupies more than one range gate. Optimization of the noncoherent integration (NCI) process is readily achieved by applying a combination of range-rate-matched, zero-order integration filters (accumulators) over the hypothesized range trajectory. These filters are implemented in the noncoherent integration processor 90 in this exemplary embodiment. This NCI trajectory is illustrated in FIG. 3, which plots the range closure as a function of the CPI number over the PDI interval, where the hypothesized differential Doppler is assumed to be Mach 2. In this representative scenario, the PRF is 25 KHz, the CPI is 128/PRF, the PDI ratio is 10:1, the CPI overlap is 75%, the range gate is about 20 meters, and the sampling interval is on the order of 10 meters. 50% overlapped range gates, providing 10-meter effective range-gate separation, are formed to reduce range-gate straddle loss during range-walk trajectories. In the following discussion, the outputs of these 50% overlapped range-gates are identified as range samples. FIG. 3 demonstrates that a Mach-2 range-rate update at the PDI rate requires noncoherent integration traversal over four contiguous range samples (four consecutive 50%-overlapped range gates), i.e., that noncoherent integration is accomplished over 4 contiguous range samples. A Mach-2 range closure implies that, in the time corresponding to 10 overlapping (OL) CPIs, range closure would amount to 10 meters (the range separation between sequential range samples), and any additional accumulation of estimates from successive CPIs corresponding to that range sample would degrade performance. Consider the following example.

If a target first appears at the beginning of range sample $R_0$, then, with Mach-2 range closure, it will have exited range sample $R_0$ after 10 OL CPIs and entered range sample $R_1$. This is the noncoherent integration traversal. With the target closing in range, it is desired to integrate a succession of radar-parameter estimates along a range trajectory corresponding to this range closure, without integrating estimates from CPIs that do not contain the target. Since the range sample in which the target first appeared is not precisely known, the hypothesized trajectory must be implemented for each range sample within a cued range interval. In this example, an $R_0$-based CPI will contain N (e g., N=128) $R_0$ samples. One hypothesized range walk will include $R_0$, $R_1$, $R_2$, $R_3$. An adjacent range walk will include $R_1$, $R_2$, $R_3$, $R_4$. The next adjacent range walk will include $R_2$, $R_3$, $R_4$, $R_5$, and so on.

In each of these trajectories, (these all assume a single range-rate hypothesis, e.g., Mach-2 closing), the integration would include:

Beginning trajectory at $R_0$: 10 OL CPIs in $R_0$, 12 OL CPIs in $R_1$, 12 OL CPIs in $R_2$, 3 OL CPIs in $R_3$, then, beginning trajectory at $R_1$: 10 OL CPIs in $R_1$, 12 OL CPIs in $R_2$, 12 OL CPIs in $R_3$, 3 OL CPIs in $R_4$, and so on.

It is apparent from FIG. 3 that noncoherent integration is readily accomplished by a contiguous set of piecewise zero-order integration filters that are accumulated over a range trajectory matched to the hypothesized differential Doppler. FIG. 3 illustrates for what duration (how many OL CPIs) the target will appear at each range sample under Mach-2 range closure. Assuming the target first appears at range sample $R_0$, it will not leave $R_0$ and enter $R_1$ ($R_1=R_0-10$ meters; $R_2=R_0-20$ meters, etc.) until 10 OL CPIs have been processed. After 10 OL CPIs, no more data from succeeding CPIs corresponding to range sample $R_0$. should be integrated. The target will have "effectively emerged" from $R_0$ and entered $R_1$ (CPI #11 straddles $R_0$ and $R_1$). Now the OL CPIs corresponding to the closer range sample $R_1$ will be integrated; it turns out that 12 OL CPIs is an appropriate number for range sample $R_1$ and for range sample $R_2$. By the time $R_3$ is reached, there are only 3 OL CPIs remaining within the PDI interval. The remaining 3 OL CPIs are integrated. Thus, in this example, the integrations for the PDI are 10+12+12+3=37=4N−3, where N=10 nonoverlapping contiguous CPIs. How the 37 OL CPIs are distributed over consecutive range samples is determined by a hypothesized range rate.

Only one trajectory is illustrated in FIG. 3. If there is some significant uncertainty in the range-rate estimate (hypothesis) provided by a third-party source, e.g a fire-control computer associated with a surveillance radar, multiple range-rate hypotheses are readily accommodated by the NGE algorithm in accordance with the invention. In contrast, noncoherent integration implemented in conventional radars will not readily accommodate multiple range-rate hypotheses.

In FIG. 3, noncoherent integration traversal over four contiguous range samples is accomplished with zero-order filter lengths corresponding to:

10 CPIs at range $R_0$
12 CPIs at range $R_0-10$ m.
12 CPIs at range $R_0-20$ m.
3 CPIs at range $R_0-30$ m. for a total noncoherent integration of 37 CPIs. The corresponding number of contiguous nonoverlapping CPIs is 10. To accommodate the apparent range-rate uncertainty in this example, an additional three range samples are required.

In FIG. 3, the numbers on the CPI-number axis correspond to the beginning of the associated CPI interval. Also, the slanted line illustrates that the target-to-radar range closure=34 meters (3.4 range-sample spread) over the PDI interval. Mach-2 at sea level=662 meters/second; 10 contiguous nonoverlapping CPIs is on the order of 10×(128 PRIs)=51.2 milliseconds; PRI=1/(25kHz); Mach-2 PDI-interval range closure is on the order of (662 m/sec)×(51.2 ms) or about 34 meters.

The NGE algorithm, applicable to the development of both target-detection statistics and target-parameter estimates, is described by the following equation for the 75%-overlapped-CPI case. This equation, which exhibits a deterministic closed form, is approximately optimal, and is suitable for modest range-rate engagements ($\leq$Mach 3). Higher range-rate engagements will probably require an adaptive range-walk strategy in connection with the sensing of contiguous-range-sample transitions.

Specifically, for the representative case illustrated in FIG. 3, the NGE algorithm is given, approximately, by:

$$Z(k, R_0) = \sum_{i=1}^{L} Y_i(k, R_0) + \sum_{i=L+1}^{2(L+1)} Y_i(k, R_0 \pm \Delta R_f) + \sum_{i=2(L+1)+1}^{3(L+1)+1} Y_i(k, R_0 \pm 2\Delta R_f) + \ldots + \sum_{i=(C-1)(L+1)+2}^{M} Y_i[k, R_0 \pm (C-1)\Delta R_f]$$

(negative sign in function arguments applies to range closure in FIG. 3 illustration)
where $Y_i(k, R_0+l\Delta R_f)$=magnitude of $X_i(k, R_0+l\Delta R_f)$, in the case of processing a target detection statistic, or $(1/M)\Theta_i(k, R_0+l\Delta R_f)$, in the case of processing a target-parameter estimate, such as a target angle $\Theta$; i~CPI #, k=1, . . . , K; K=the number of filters in the FFT; 1=0, ±1, . . . , ±(C−1); $R_0$~initial range sample in the hypothesized range-walk trajectory; $\Delta R_f$=separation between contiguous range samples from the range filters; $\Delta R_{CPI}$=(dR/dt) (CPI); $\Delta R_{PDI}$=(dR/dt) (PDI$_{int}$); PDI$_{int}$=(PDI) (K/PRF); L=Int[4 $(\Delta R_f/\Delta R_{CPI})$−1.75]=the number of overlapped CPIs accumulated in the leading zero-order accumulator; N=the number of contiguous CPIs within the PDI interval; M=the number of overlapping CPIs within the PDI interval; M=4N−3 for 75% CPI overlap; and C=Int[$(\Delta R_{PDI}/\Delta R_f)$+1]= the number of consecutive range samples included in the hypothesized range-walk trajectory; Int[*]=integer value of *.

Figure 4:
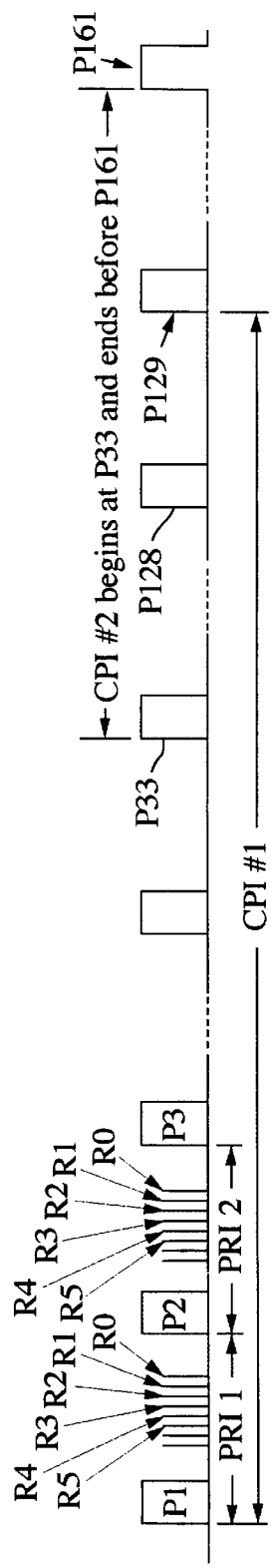
FIG. 4 is a time diagram illustrative of the operation of the system for the case of a 128-point FFT CPI and 75% overlapping the CPI sequences.

FIG. 4 is a time diagram illustrative of the operation of the system for the case of a 128-point FFT CPI, i.e. a CPI covering 128 PRIs, and 75% overlapping of the CPI sequences. In this example, a closing range rate of Mach 2 and other parameter values for the example of FIG. 3 are assumed, and the Range-Rate-Aiding function used in conventional PDI is disengaged. The $R_0$ range walk encompasses $R_0$, $R_1$, $R_2$ and $R_3$, the $R_1$ range walk encompasses $R_1$, $R_2$, $R_3$ and $R_4$, and so on. FIG. 4 shows that there are successive transmitted pulses and pulse repetition intervals (PRIs), with CPI#1 starting at the first PRI, and CPI#2 starting at the 33rd PRI, for a 75% overlap. Data samples at ranges $R_0-R_5$ are received in the intervening intervals between transmitted pulses.

The exemplary Mach-2 closing range rate implies that the target will close approximately 34 meters, equivalent to a 3.4 range-sample spread. If, at the beginning of the PDI interval, the target is in $R_0$, then, by the end of the PDI interval, it will be in $R_3$. To maximize target detection and/or target-parameter-estimation performance, the appropriate estimates must be integrated from 37 OL CPIs spread over 3.4 range samples. The range-walk strategy dictates the following procedure: stay (integrate estimates) in $R_0$ for 10 OL CPIs, then, move to $R_1$ and stay (integrate estimates) there for 12 OL CPIs, then, move to $R_2$ and stay (integrate estimates) there for 12 OL CPIs, and finally, move to R3 and stay (integrate estimates) there for the remaining 3 OL CPIs (end of PDI).

In FIG. 3, only one range-walk trajectory is illustrated, beginning with range sample $R_0$. There will be a range walk for all hypothesized target ranges, i.e. at the beginning of the PDI interval, the target could have been located at range sample $R_0$, or $R_1$, or $R_2$, or $R_3$, or $R_4$, or etc. A Mach-2 closing-range-rate hypothesis assumes that, from beginning-to-end of the PDI interval, the range to the target will have been closed by approximately 34 meters. Therefore, each range walk must encompass 34 meters in this example (3₊ range-sample spread implies that the range walk covers 4 range samples).

Figure 5:
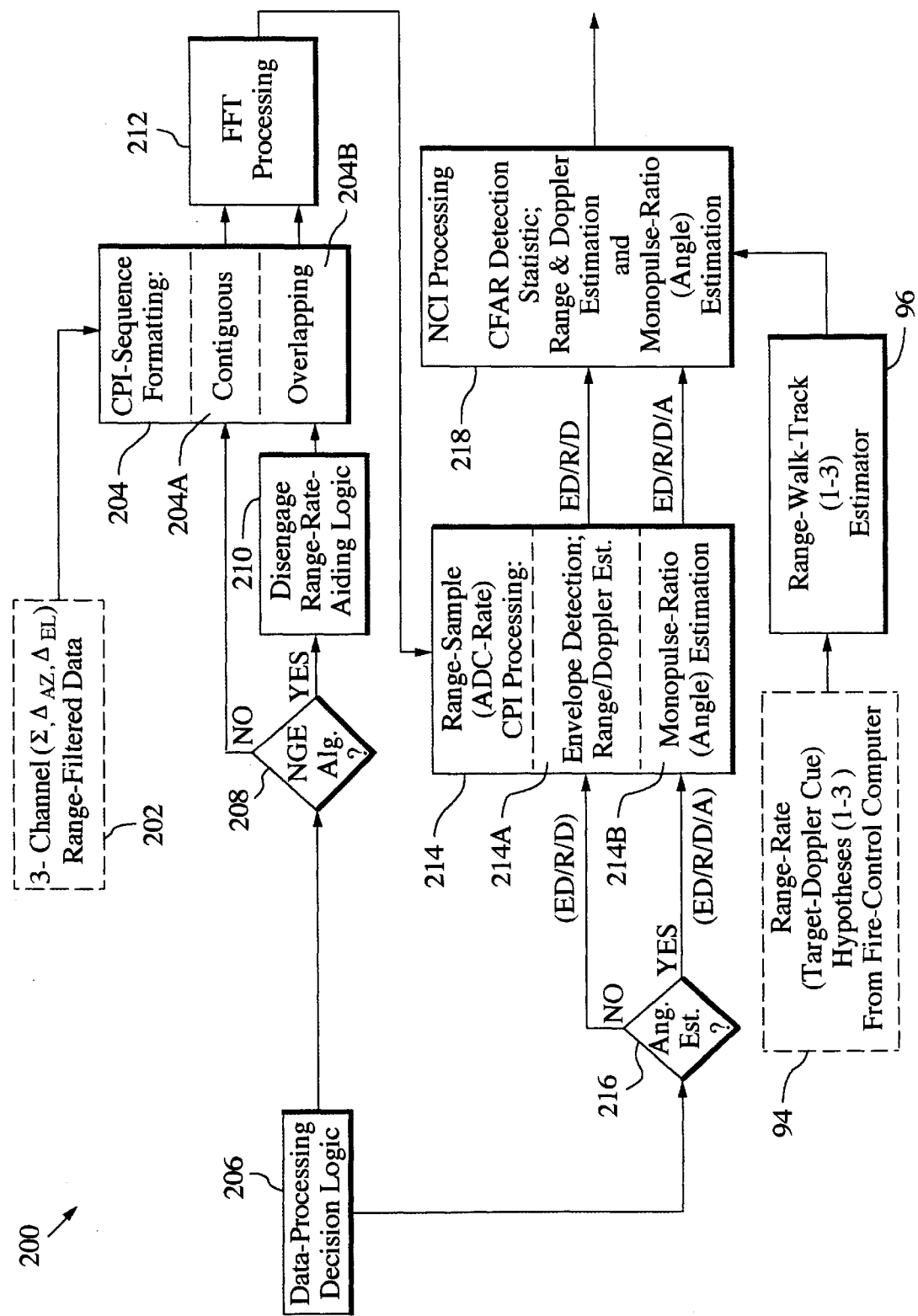
FIG. 5 is an exemplary logical flow diagram illustrating the operation of the radar system of FIG. 1 in accordance with aspects of the invention.

FIG. 5 is a logical flow diagram illustrating a method 200 of operation of the system of FIG. 1 in accordance with the invention. Step 202 indicates the providing of the 3–77channel ($\Sigma$, $\Delta_{Az}$ and $\Delta_{El}$) range-filtered data by the receiver/processor 40 to the multichannel data storage, formatting and control apparatus 60, for CPI-sequence formatting. In a conventional mode of operation, the CPI sequences are formatted (204A) to be contiguous and non-overlapping. In an NGE mode of operation in accordance with the invention, the CPI sequences are formatted (204B) to be overlapping. Block 206 represents data-processing decision logic carried out by the data-processing controller 100, to determine which mode of operation (204A or 204B) is carried out by the apparatus 60. If the decision logic determines at step 208 that the NGE algorithm is to be used, the Range-Rate-Aiding Logic is disengaged at step 210, and the overlapping mode 204B is activated. If the NGE algorithm is not to be used, at step 208, the conventional contiguous mode of operation (204A) of the apparatus 60 is selected.

Once the mode of operation of the apparatus 60 has been selected and the incoming data formatted in accordance with the selection, the formatted data is sent to the FFT engine 70 for FFT processing 212, and then to the apparatus 80 (FIG. 1) for processing (step 214). The processing mode is selected by the data-processing decision logic at 206, 218, by the decision of whether an angle estimation is to be performed. If not, processing mode 214A is selected to perform envelope detection and range/Doppler estimation (ED/R/D). If the angle is to be estimated, then processing mode 214B is selected, to perform Monopulse-Ratio (Angle) estimation (A) as well as ED/R/D. The resultant data (ED/R/D or ED/R/D/A) is provided to the NCI processor 90 for NCI processing step 218, along with the data from the Range-Walk-Track estimator 96. Depending on the type of data provided by step 214 and estimator 96, the NCI processing step provides an NGE CFAR detection statistic, range and Doppler estimation and angle estimation.

Predictions of performance enhancements in radar-target-parameter estimation, resulting from the application of the NGE algorithm, indicate that, when –80 dB Dolph-Chebyshev weights are used in an FFT window function, the NGE algorithm, using 75% overlapped CPI processing, can provide effective-SNR enhancements that range from 2.8 dB to 3.7 dB.

Predictions Df detection-performance enhancement, resulting from the NGE algorithm indicate that, with 75% overlapping, and depending on target type and specified probability of detection ($P_D$), detection performance gains vary from 2.3 dB (SW0/SW1) to 3.3 dB (SW2|$P_D$=0.9).

The NGE algorithm can be applied to all missile radar seekers, and other radar signal processors to achieve available signal-processing gains (principally, the recovery of losses associated with the severe pre-DFT amplitude weighting typically required for Doppler-filter sidelobe suppression.) This increased signal-processing gain can be achieved with a substantially reduced increase in radar-seeker hardware relative to that required for comparable gains that may be achieved via increased transmitter power.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method of processing data in a sensor system which receives signal returns from pulsed coherent transmitted signals which are transmitted with a pulse repetition rate and with a pulse repetition interval (PRI), comprising the steps of:

providing range-filtered data in response to said received signal returns;

formatting successive sets of data received during a post detection integration (PDI) interval into a plurality of overlapping coherent processing interval (CPI) data sequences;

performing Fast Fourier Transform (FFT) processing on said overlapping CPI data sequences to provide transformed data sequences;

performing range-sample CPI processing on said transformed data sequences; and performing noncoherent integration (NCI) processing on output data from said range-sample CPI processed data sequences over a range trajectory in accordance with a hypothesized range rate to provide noncoherent gain-enhanced output data, wherein a hypothesized range-rate-based range trajectory is updated at a compensation rate no more often than once per PDI interval.

2. The method of claim 1 wherein said NCI processing includes applying a combination of range-rate-matched, zero-order integration filters over the hypothesized range trajectory.

3. The method of claim 1 wherein said plurality of overlapping coherent processing interval (CPI) data sequences are overlapped by a 50% overlap rate.

4. The method of claim 1 wherein said plurality of overlapping coherent processing interval (CPI) data sequences are overlapped by a 75% overlap rate.

5. The method of claim 1 wherein said sensor system includes an antenna array, and said step of providing range-filtered data includes providing respective sum, azimuth difference and elevation difference channel signals, and wherein said formatting step, said FFT processing step, said range-sample CPI processing step and said NCI processing step are carried out with respect to each of said sum, azimuth difference and elevation difference channel signals.

6. The method of claim 5 wherein said output data includes range, Doppler and angle estimates for a detected target.

7. The method of claim 5 wherein said CPI processing step includes envelope detection and range and Doppler estimation.

8. A sensor system which receives signal returns from pulsed coherent transmitted signals which are transmitted at a pulse repetition rate and with a pulse repetition interval (PRI), comprising:

an antenna array;

a receiver/signal processor coupled to the antenna array for providing range-filtered data in response to said received signal returns;

a formatting processor for formatting successive sets of data received during a postdetection integration (PDI) interval into a plurality of overlapping coherent processing interval (CPI) data sequences;

an FFT engine for performing Fast Fourier Transform (FFT) processing on said overlapping CPI data sequences to provide transformed data sequences;

a range-sample CPI processor for performing rangesample CPI processing on said transformed data sequences;

a range-walk estimator for providing one or more range trajectories derived from one or more range-rate hypotheses; and a range-walk noncoherent integration (NCI) processor for performing NCI processing on output data from said range-sample CPI processor in accordance with hypothesized range-rate compensation to provide non-coherent gain-enhanced output data, wherein a range trajectory derived from a hypothesized range rate is updated at a compensation rate no more often than once per PDI interval.

9. The sensor system of claim 8 wherein said NCI processor is adapted to apply a combination of range-rate-matched, zero-order integration filters over the hypothesized range trajectory.

10. The sensor system of claim 8 wherein said formatting processor is adapted to format said plurality of overlapping coherent-processing-interval (CPI) data sequences with 50% overlap.

11. The sensor system of claim 8 wherein said formatting processor is adapted to format said plurality of overlapping coherent-processing-interval (CPI) data sequences with 75% overlap.

12. The sensor system of claim 8 wherein said receiver/processor is adapted to provide range-filtered data includes respective sum, azimuth difference and elevation difference channel signals, and wherein said formatting processor, said FFT engine, said range-sample CPI processor and said NCI processor are adapted to process each of said sum, azimuth difference and elevation difference channel signals.

13. The sensor system of claim 12 wherein said output data includes range, Doppler and angle estimates for a detected target.

14. The sensor system of claim 12 wherein said CPI processor is adapted to perform envelope detection and range and Doppler estimation functions.

* * * * *